United States Patent
Schulz et al.

(10) Patent No.: US 10,885,382 B2
(45) Date of Patent: Jan. 5, 2021

(54) METHOD AND DEVICE FOR CLASSIFYING AN OBJECT FOR A VEHICLE

(71) Applicant: Robert Bosch GmbH, Stuttgart (DE)

(72) Inventors: Udo Schulz, Vaihingen/Enz (DE); Florian Schmitt, Winnenden (DE); Gregor Schwarzenberg, Calw (DE)

(73) Assignee: Robert Bosch GmbH, Stuttgart (DE)

( * ) Notice: Subject to any disclaimer, the term of this patent is extended or adjusted under 35 U.S.C. 154(b) by 97 days.

(21) Appl. No.: 15/990,101

(22) Filed: May 25, 2018

(65) Prior Publication Data

US 2018/0349744 A1    Dec. 6, 2018

(30) Foreign Application Priority Data

Jun. 6, 2017   (DE) .................. 10 2017 209 496

(51) Int. Cl.
*G06K 9/62* (2006.01)
*G06K 9/00* (2006.01)
*G06K 9/46* (2006.01)

(52) U.S. Cl.
CPC ....... *G06K 9/6227* (2013.01); *G06K 9/00791* (2013.01); *G06K 9/4604* (2013.01); *G06K 9/4652* (2013.01); *G06K 9/6262* (2013.01); *G06K 9/6267* (2013.01)

(58) Field of Classification Search
CPC .......................... G06K 9/00791; G06K 9/6262
See application file for complete search history.

(56) References Cited

U.S. PATENT DOCUMENTS

| | | | | |
|---|---|---|---|---|
| 7,565,139 | B2 * | 7/2009 | Neven, Sr. ............. | G06K 9/228 455/3.01 |
| 9,183,447 | B1 * | 11/2015 | Gdalyahu .......... | G06K 9/00791 |
| 2004/0234136 | A1 * | 11/2004 | Zhu .......................... | G06T 7/20 382/224 |
| 2011/0164815 | A1 * | 7/2011 | Sharma ............. | G06K 9/00664 382/165 |
| 2014/0267793 | A1 * | 9/2014 | Wang ................. | G06K 9/00785 348/207.1 |
| 2016/0231748 | A1 * | 8/2016 | Ogale ................ | G06K 9/00805 |

OTHER PUBLICATIONS

Chang, Wen-Chung, et al., "Online Boosting for Vehicle Detection", IEEE Transactions on Systems, Man, and Cybernetics, Part B (Cybernetics),vol. 40, No. 3, 2010,pp. 892-902.

* cited by examiner

*Primary Examiner* — Casey L Kretzer
(74) *Attorney, Agent, or Firm* — Norton Rose Fulbright US LLP; Gerard Messina

(57) ABSTRACT

A method for classifying an object for a vehicle. The method includes at least: classifying, extracting and creating. In the classifying, an object from a camera image is classified using a generic classifier. In the extracting, at least one specific object feature assigned to the object is extracted from the camera image. In the creating, a specific classifier is created using the specific object feature.

17 Claims, 4 Drawing Sheets

METHOD AND DEVICE FOR CLASSIFYING AN OBJECT FOR A VEHICLE

RELATED APPLICATION INFORMATION

The present application claims priority to and the benefit of German patent application no. 10 2017 209 496.6, which was filed in Germany on Jun. 6, 2017, the disclosure which is incorporated herein by reference.

FIELD OF THE INVENTION

The present invention is directed to a device or to a method for classifying an object for a vehicle. The present invention is also directed to a related computer program.

BACKGROUND INFORMATION

A recognition of objects with the aid of a camera system is gaining increasingly in importance in many fields. In particular in the automotive field, camera systems having functions for recognizing objects, for example, pedestrians, for diverse assistance functions all the way up to automated driving are often a mandatory requirement. Corresponding object recognition devices in these cases assign recognized objects an object type with the aid of a trained generic classifier.

SUMMARY OF THE INVENTION

Against this background, a method for classifying an object for a vehicle, furthermore, a device that uses this method, and finally a corresponding computer program according to the main claims are presented with the approach presented herein. Advantageous refinements of and improvements on the device specified in the independent claim are possible with the measures listed in the dependent claims.

The advantages achievable with the approach presented are that a response time in a recognition of the object, as well as a robustness in an object tracking of the object may be improved by a creation of a specific classifier presented herein in addition to a known generic classifier.

A method for classifying an object for a vehicle is presented. The method includes at least a step of classifying, a step of extracting and a step of creating. In the step of classifying, an object from a camera image is classified using a generic classifier. In the step of extracting, at least one specific object feature assigned to the object is extracted from the camera image. In the step of creating, a specific classifier is created using the specific object feature.

This method may be implemented in software or in hardware, for example, or in a mixed form of software and hardware, for example, in a control unit. This method may be implemented, for example, in an object recognition device for a vehicle camera.

With the method presented herein, detected objects in camera images are no longer classifiable solely by the generic classifier, but in addition also by the newly created specific classifier. This enables a more rapid classification of objects and also a classification of objects previously unknown or difficult to recognize.

In order to apply and/or to update the specific classifier, an additional object from an additional camera image may be classified in the step of classifying using the generic classifier and the specific classifier; in the step of extracting, at least one additional specific object feature assigned to the object may be extracted from the camera image; and in the step of creating, the specific classifier may be adapted using the additional specific object feature.

In the step of extracting, an object feature may be extracted from the camera image, for example, which represents at least one color and/or one structure and/or one form of the generically classified object. Such object features are not accounted for by generic classifiers, since they do not generally pertain to all object examples of an object type, they may, however, be used in the specific application, for example, of a reliable object tracking of the recognized object.

In the step of creating, the specific classifier may be stored in a ring memory unit.

To prepare the camera image, the method may include a step of ascertaining, in which the camera image is ascertained using a surroundings detection unit. This surroundings detection unit may be, or at least may include, a camera, for example, a vehicle camera, and/or a radar device.

In order to also enable an adaptation or updating of the generic classifier, the method according to one advantageous specific embodiment may include a step of storing, in which the camera image is stored if, in the step of classifying, a classification accuracy with respect to the classifying of the object is below a threshold value. The step of storing may be carried out before the step of extracting, whereby the classification accuracy may be below the threshold value, for example, if at least one generically detected object feature of the object categorized as inaccurate is situated on the camera image.

In the step of storing, the camera image may be sent to a training unit situated externally of the object recognition unit, in order to enable a retraining of the generic classifier of the object recognition device.

The approach presented herein further provides a device, which is configured to carry out, activate and implement the steps of a variant of a method presented herein in corresponding units. With this embodiment variant of the approach in the form of a device as well, the object underlying the approach may be quickly and efficiently achieved. This device may be part of the object recognition device.

For this purpose, the device may include at least one processing unit for processing signals or data, at least one memory unit for storing signals or data, at least one interface to a sensor or to an actuator for reading in sensor signals from the sensor or for outputting data signals or control signals to the actuator and/or at least one communication interface for reading in or outputting data, which are embedded in a communication protocol. The processing unit may, for example, be a signal processor, a microcontroller or the like, where the memory unit may be a flash memory, an EPROM or a magnetic memory unit. The communication interface may be configured to read in or output data wirelessly and/or via hardwire, a communication interface being able to read in or output the hard-wired data, being able to read in these data, for example, electrically or optically from a corresponding data transmission line or output into a corresponding data transmission line.

A device may be understood in the present case to be an electrical device, which processes data signals and outputs control signals and/or data signals as a function thereof. The device may include an interface, which may be configured in hardware and/or in software. In the case of a design in hardware, the interfaces may, for example, be part of a so-called system ASIC, which contains a wide variety of functions of the device. It is also possible, however, that the interfaces are dedicated, integrated circuits or are made at least partially of discrete components. In a design in software, the interfaces may be software modules present, for example, on a microcontroller alongside other software modules.

In one advantageous embodiment, a controlling of a classification of an object takes place via the device. For this purpose, the device may, for example, access sensor signals, such as a classification signal, an extraction signal and a creation signal. The activation takes place via actuators, such as a generic classifier unit, which is configured to carry out a generic classification of an object recognized in a camera image using a generic classifier, an extraction unit, which is configured to extract at least one specific object feature assigned to the object, and a specific classifier unit, which is configured to at least create a specific classifier using the specific object feature.

A computer program product or computer program having program code, which may be stored on a machine-readable medium or memory medium, such as a semiconductor memory, a hard disk memory or an optical memory, and which is used for carrying out, implementing and/or activating the steps of the method according to one of the specific embodiments described above is also advantageous, in particular, if the program product or program is executed on a computer or on a device.

Exemplary embodiments of the approach presented herein are depicted in the drawings and explained in greater detail in the following description.

In the following description of the exemplary embodiments of the present approach, identical or similar reference numerals are used for the elements, which are represented in the various figures and which act similarly, a repeated description of these elements being omitted.

DETAILED DESCRIPTION

Figure 1:
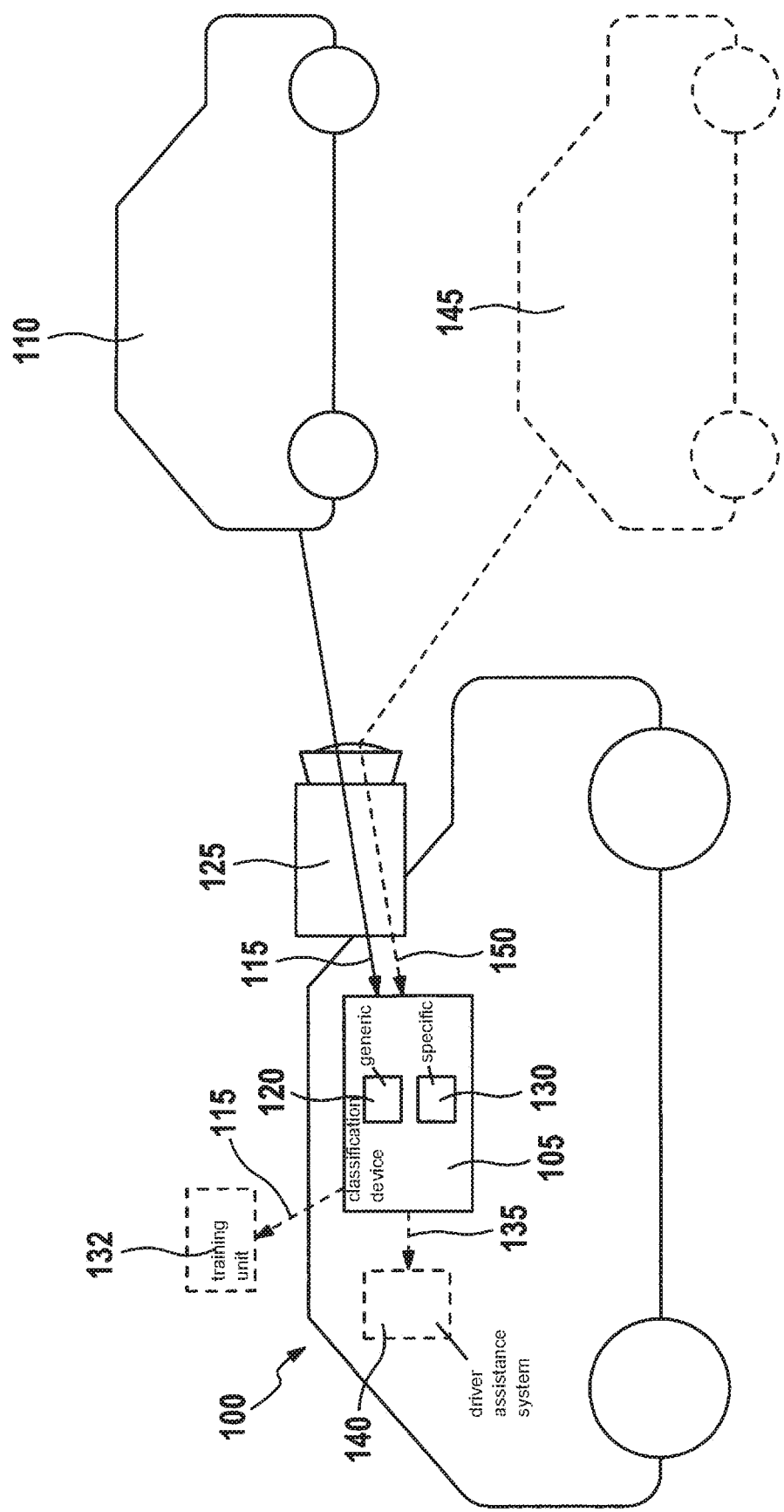
FIG. 1 schematically shows a representation of a vehicle including a device for classifying an object according to one exemplary embodiment.

FIG. 1 schematically shows a representation of a vehicle 100, including a device 105 for classifying an object 110 according to one exemplary embodiment.

Device 105 is configured to classify object 110, which according to this exemplary embodiment is optionally shaped as an additional vehicle. For this purpose, device 105 is configured to classify object 110 from a camera image 115 using a generic classifier 120. Camera image 115 according to this exemplary embodiment is read in and prepared by a surroundings detection unit 125 of vehicle 100. Device 105 is further configured to extract at least one specific object feature assigned to object 110 from camera image 115. Device 105 is also configured to create a specific classifier 130 using the specific object feature, in order to classify object 110.

The features of device 105 described below are optional. According to one exemplary embodiment, device 105 is configured to extract from camera image 115 the object feature, which represents at least one color and/or one structure and/or one form of the generically classified object. Device 105 also stores the created specific classifier 130 according to this exemplary embodiment in a ring memory unit.

Device 105 is further configured to store camera image 115 if, during classification by generic classifier 120, a classification accuracy with respect to the classification of object 110 is below a threshold value. For this purpose, device 105 is configured to send camera image 115 to a training unit 132 situated externally of device 105 and/or to one situated externally of an object detection device that includes device 105.

Device 105 is also configured to provide object 135 classified by device 105 for a driver assistance system 140 of vehicle 100 or to send object 135 to driver assistance system 140. According to this exemplary embodiment, device 105 is configured to classify an additional object 145 from an additional camera image 150 using generic classifier 120 and specific classifier 130, to extract an additional specific object feature assigned to additional object 145 from additional camera image 150, and to adapt specific classifier 130 using the additional specific object feature.

Figure 2:
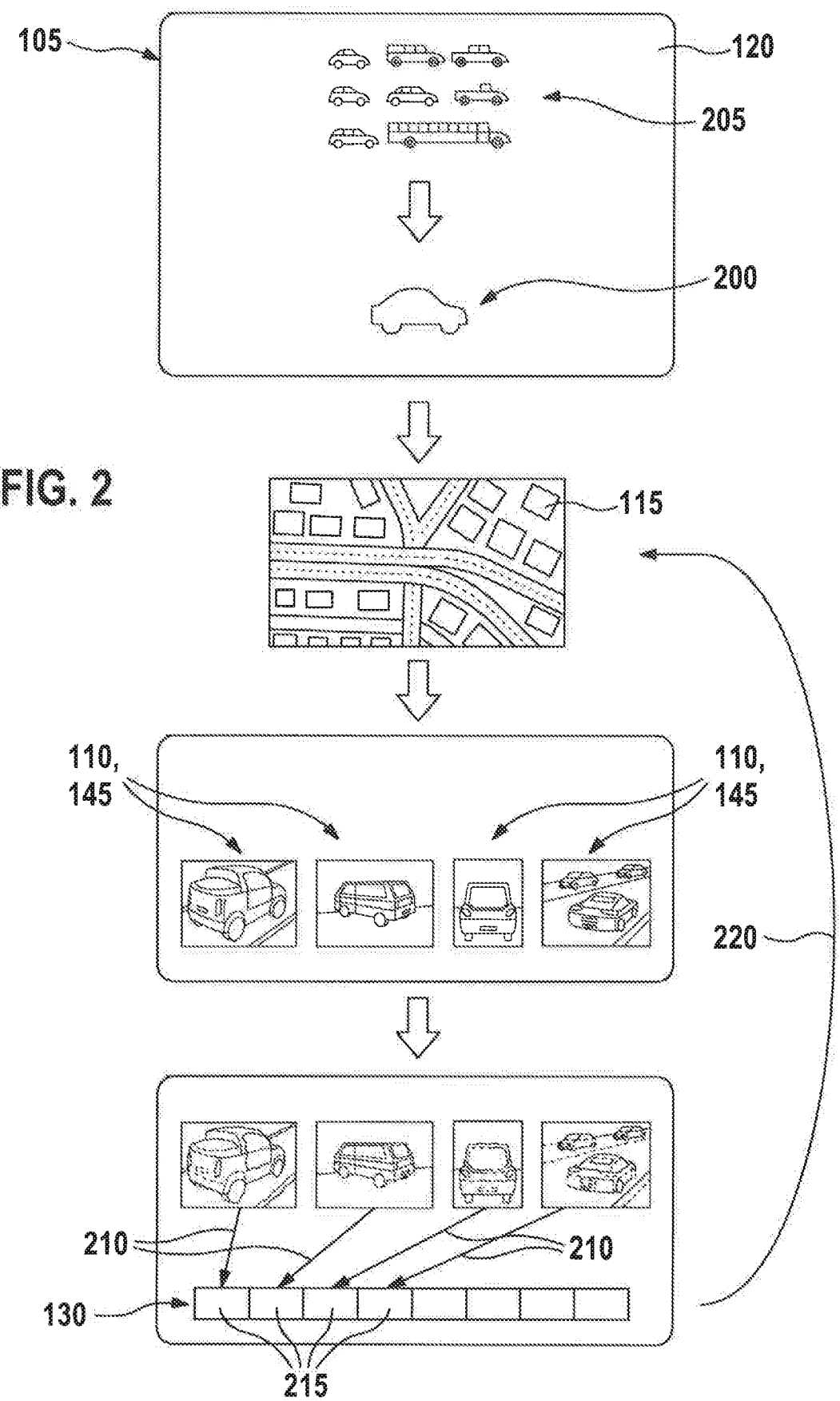
FIG. 2 schematically shows a representation of a device for classifying an object for a vehicle according to one exemplary embodiment.

FIG. 2 schematically shows a representation of a device 105 for classifying an object for a vehicle according to one exemplary embodiment. This may be device 105 described with reference to FIG. 1. An application example of generic classifier 120 and of specific classifier 130 is shown in FIG. 2.

Generic classifier 120 represents or includes at least one learned vehicle model 200, which was learned previously based on a plurality of object examples 205 in an offline training. If, during a use in road traffic, objects 110, 145 are then displayed in camera image 115 and/or in the additional camera image, which are atypical, or which were as yet unrecognized objects or vehicles during the training time of the offline-training, these objects or vehicles would only be poorly and/or slowly recognized with the aid of generic classifier 120. Device 105 presented herein then extracts essential features of objects 110, 145 in the form of the specific object features 210 and, in this way, ascertains specific classifier 130 or adapts specific classifier 130. Specific classifier 130 according to this exemplary embodiment is stored in a memory unit, an additional application 220 taking place for each memory entry 215 in the memory unit.

In other words, device 105 presented herein enables an online-learning of classifiers 120, 130 for an object detection in camera systems or for camera systems. For this purpose, device 105 according to an alternative exemplary embodiment is accommodated in or on surroundings detection unit 125, which includes the at least one camera system.

One task of device 105 in this case is to carry out in the camera systems, installed in vehicles, for example, for recognizing objects 110, 145, an online update of classifiers 120, 130 for the object detection, for example, for unreliable and/or blurred object detection, after a "reliably" implemented object classification by tracking, plausibility check over time, etc. See also in this regard FIG. 4.

Unlike known systems, device 105 presented herein advantageously also enables underrepresented object examples 205 to be easily recognized. Furthermore, trained generic classifiers 120 in modern systems are generically configured for recognizing particular object types, in order to ensure an adequate object recognition in all situations worldwide. Accordingly, features are used for this generic recognition that apply generally to all object examples 205, i.e., specific features such as color or fixed structures, for example, license plates, are rejected as recognition features in the process. This results, on the one hand, in a generally somewhat longer time for object recognition, since classification detections for achieving a low error rate must be checked for plausibility via a verification. On the other hand, underrepresented object examples 205 such as, in particular, small series vehicles or new vehicle generations, are particularly poorly detected. A poor object detection, a classification of an object time-delayed as result of tracking/plausibility checking, does not cause a shift or adaptation in present systems, but rather the inadequacy of the detection of these objects remains permanent. However, the quality level or recognition rate may be improved with the online-training of classifiers 120, 130 presented herein.

For this purpose, an additional classifier, namely specific classifier 130, is advantageously implemented in device 105 in parallel to already existing generic classifier 120. Generic classifier 120 recognizes, in principle, all characteristics of the desired object type, with the cited limitations relating to response time and recognition of new/atypical object characteristics. For objects that have been detected with this generic classifier 120 and classified via a chronological plausibility check (tracking) and verification, specific features for this object, such as color and structure, may be extracted from camera image 115, which may be a video image, and used for creating/adapting additional specific classifier 130. On the one hand, this allows for a more stable object tracking even in the case of partial concealment of the object or image distortions caused, for example, by windshield wipers when raining. On the other hand, the object may be detected and classified significantly faster after it is completely concealed, for example, by other vehicles or in the case of preceding drivers after curves. Accordingly, features may be used for this specific classifier 130, which are unusable for a generic classifier 120, since they would affect the general recognition of all possible object characteristics.

If, for example, color is after all provided to generic classifier 120 as the feature for the training, and no blue vehicles are found in the example data, in this case object examples 205, then blue vehicles would no longer be recognized.

In local surroundings of the vehicle, the inclusion of this specific classifier 130 in parallel to generic classifier 120 offers the advantages previously addressed with respect to response time during recognition and robustness in the object tracking.

A base object detection via generic classifier 120 remains further necessary here in order to ensure that a quality of the object detection meets the demands imposed at the point in time of the product delivery.

Figure 4:
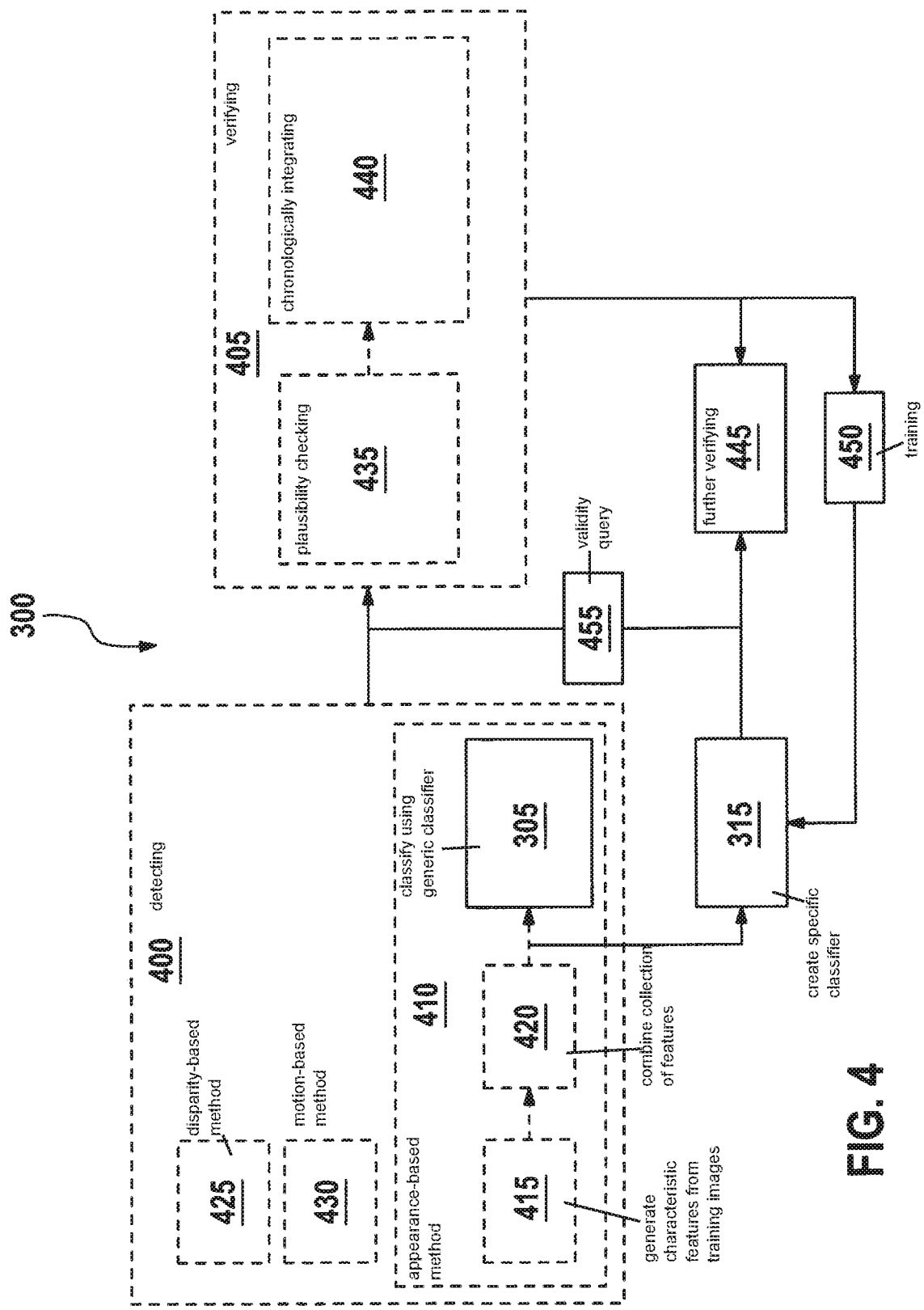

In an online training phase, an input of specific classifier 130 is connected to an input of generic classifier 120 and an output of specific classifier 130 is connected to an output of an existing verification, plausibility check and integration; see also in this regard FIG. 4. Characteristic features are extracted as initial data for specific classifier 130 from image sections of camera image 115, 145, in which the relevant object in the video has been recognized. These specific object features 210 precisely describe this object characteristic in the form of height, width, structural information, as well as color, thus being precisely configured to recognize this object only.

According to this exemplary embodiment, specific classifier 130 is configured in such a way that it classifies multiple object characteristics. Alternatively, multiple instances of these specific classifiers 130 up to a predefined number, could be present, which are populated depending on the driving situation. The management of these classifiers 130 in this case is implemented via a ring memory, in which an oldest entry is discarded in the event a new object characteristic is to be stored.

As previously described in FIG. 1, an optional adaptation of generic classifier 120 is also enabled by device 105. In addition to an adaptation to dedicated object characteristics, an assessment of generic classifier 120 may also be carried out here with respect to recognition time and robustness of the respective object characteristics. For those objects 110, 145, which were slowly or unreliably recognized by generic classifier 120, which, for example, were first classified by a chronological verification described in greater detail in FIG. 4 or alternative recognition methods, such as an egomotion recognition, corresponding image data of camera image 115 are stored in a separate memory. This separate memory is represented in FIG. 1 as the training unit or as a part of the training unit; however, the separate memory according to an alternatively exemplary embodiment may also be part of device 105. In this way, the example data of object characteristics, which are or were insufficiently recognized with the present version of generic classifier 120, may be centrally stored per online connection and/or per repair shop, in order to be used for a re-training of generic classifier 120.

Figure 3:
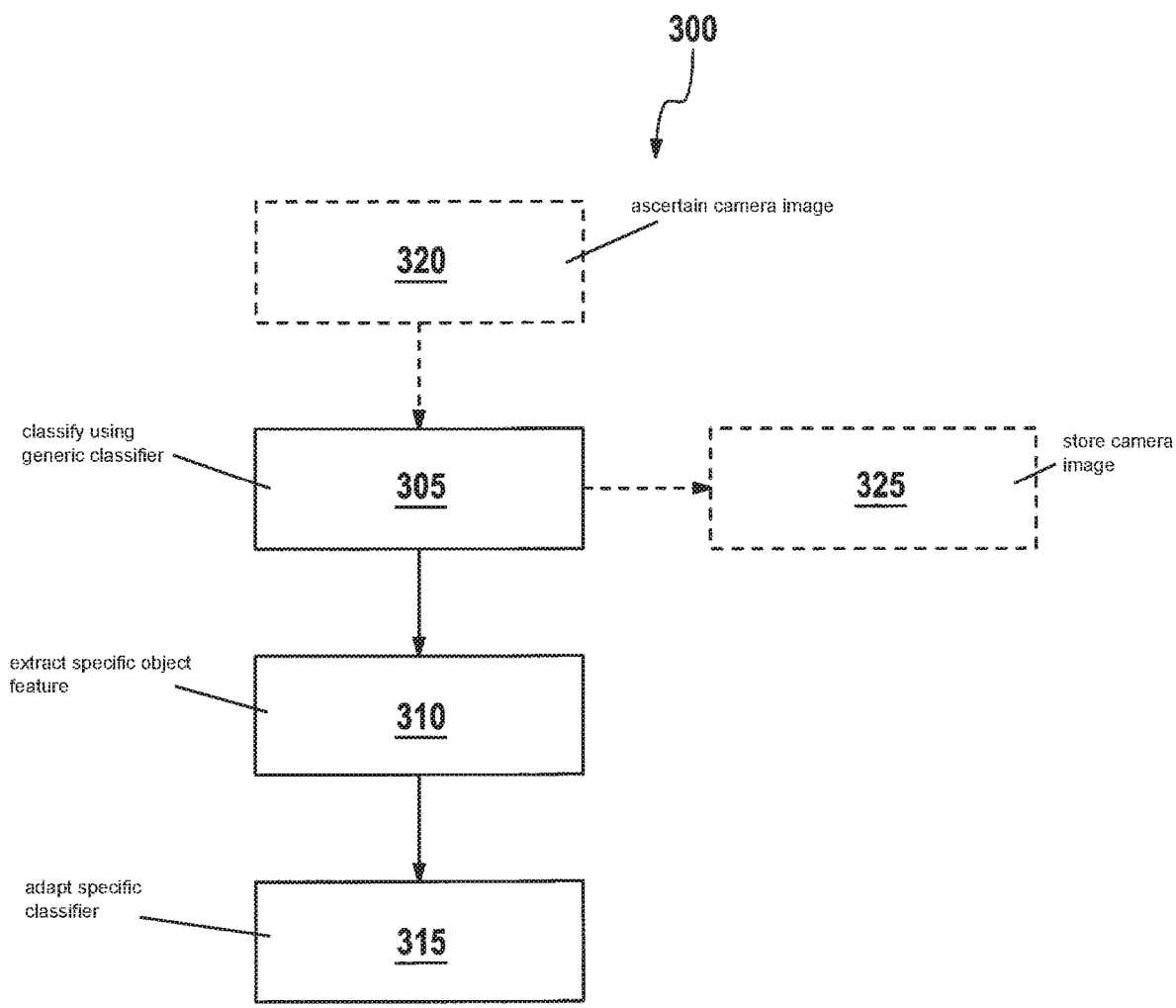
FIGS. 3 and 4 each show a flow chart of a method for classifying an object for a vehicle according to one exemplary embodiment.

FIG. 3 shows a flow chart of a method 300 for classifying an object for a vehicle according to one exemplary embodiment. This may be a method 300, which is implementable by one of the devices described with reference to one of the preceding figures.

Method 300 includes at least a step 305 of classifying, a step 310 of extracting and a step 315 of creating. In step 305 of classifying, an object from a camera image is classified using a generic classifier. In step 310 of extracting, at least one specific object feature assigned to the object is extracted from the camera image. In step 315 of creating, a specific classifier is created using the specific object feature.

The following exemplary embodiments of method 300 are optional:

In addition or alternatively according to an alternative exemplary embodiment, an additional object from an additional camera image is classified in step 305 of classifying using the generic classifier, at least one additional specific object feature from the additional camera image assigned to the object being extracted in step 310 of extracting, and the specific classifier being adapted in step 315 of creating using the additional specific object feature.

According to this exemplary embodiment, the object feature, which represents at least one color and/or one structure and/or one form of the generically classified object, is extracted from the camera image in step 310 of extracting.

In step 315 of creating, the specific classifier is stored in a ring memory unit.

Method 300 according to this exemplary embodiment optionally includes a step 320 of ascertaining and a step of storing 325.

In step 320 of ascertaining, the camera image is ascertained using a surroundings detection unit.

In step 325 of storing, the camera image is stored if, in step 305 of classifying, a classification inaccuracy with respect to the classification of the object is below a threshold value. According to this exemplary embodiment, the camera image is sent in step 325 of storing to a training unit situated externally of an object detection device.

The method steps presented herein may be carried out repeatedly, as well as in a sequence other than that described.

FIG. 4 shows a flow chart of a method 300 for classifying an object according to one exemplary embodiment. This may be method 300 described in FIG. 3 including additional steps.

Method 300 according to this exemplary embodiment enables a comprehensive object detection and includes for this purpose a block 400 of detecting and a block 405 of verifying. Block of detecting 400 includes a so-called appearance-based method 410, which in turn includes a step 415 of generating, a step 420 of combining and the step 305 of classifying previously described in FIG. 3. Block 400 of detecting according to an alternative exemplary embodiment also includes a so-called disparity-based method 425 for generating hypotheses and/or a so-called motion-based method 430.

Block 405 of verifying includes a step 435 of plausibility checking and a step 440 of chronologically integrating.

Step 315 of creating is situated between block 400 of detecting and block 405 of verifying. Method 300 also includes a step 445 of further verifying between block 405 of verifying and step 315 of creating.

Stable groups of features are sought in block 400 of detecting, which describe potential objects to be recognized. In appearance-based method 410, characteristics of an object type, which in this case is a vehicle, are detected on the basis of a training data set. According to this exemplary embodiment, the features of the vehicle are filtered in appearance-based method 410 with the aid of a Gabor filter and the generic classifier is classified with the aid of a support vector machine. As part of the process, characteristic features, in this case, hair features, are generated from training images in step 415 of generating. In step 420 of combining, a collection of features is combined in a database to form an overall description of the object type. In step 305 of classifying, the generic classifier, which according to this exemplary embodiment is an Adaboost algorithm, is laboriously trained and/or a probability distribution of the features is modelled, in order to be able to clearly assign a feature vector to an object type.

In Block 405 of verifying, erroneous and/or inaccurate object hypotheses from block 400 of detecting are checked for plausibility and improved via chronological integration. For this purpose, parameterized models and/or templates are compared in step 435 of plausibility checking with image data, according to this exemplary embodiment, 3D-wireframe models are created for the vehicle, the projection of which in an image plane produces edge patterns. These patterns are sought in an edge-segmented gray-value image of the scene. In addition or alternatively, at least one license plate, lights and/or windshields are used. A chronological integration is carried out in step 440 of chronologically integrating. A distinction is made in this case between non-living physical objects and subjects. Non-living physical subjects in this case are distinguished with the aid of prediction by extrapolation on the basis of physical laws and subjects are distinguished with the aid of identification of intentions, actions and/or action alternatives. Thus, a distinction is made, for example, between pedestrians, cyclists, passenger cars, trucks, etc. In step 440 of chronologically integrating, a motion model of the object hypothesis is also adapted, a bundling of information in the action model is undertaken and/or a comparison with surroundings models is carried out, here, for example, the plausibility of an estimated course of a traffic lane with a vehicle motion is checked, for example, base points of objects with a road geometry.

Situated between step 315 of creating and step 445 of additionally verifying and/or block 405 of verifying is a step 450 of training, in which a training is carried out. A validity query 455 is also carried out between step of creating 315 and block 405 of verifying.

If an exemplary embodiment includes an "and/or" linkage between a first feature and a second feature, this is to be read in the sense that the exemplary embodiment according to one specific embodiment includes both the first feature and the second feature, and according to another specific embodiment, either only the first feature or only the second feature.

What is claimed is:

1. A method for classifying an object for a vehicle, the method comprising:
   reading in, using a camera situated on the vehicle, a camera image of an object external to the vehicle;
   detecting the object including classifying, using a device including hardware situated in the vehicle, the object from the camera image using a generic classifier, the generic classifier being a trained classifier including a learned object model which was learned in off-line training;
   checking plausibility of a result of the detecting by comparing parameterized models and/or templates with image data;
   extracting, using the device, at least one specific object feature assigned to the object from the camera image;
   creating, using the device, a specific classifier using the specific object feature; and
   on-line training the specific classifier.

2. The method of claim 1, wherein in the classifying, an additional object from an additional camera image, read in using the camera, is classified, using the device and using the generic classifier and the specific classifier, in the extracting, at least one specific object feature assigned to the object is extracted, using the device, from the additional camera image read in using the camera, and, in the creating, the specific classifier is adapted, by the device, using the additional specific object feature.

3. The method of claim 1, wherein in the creating, the specific classifier is stored in a ring memory unit.

4. The method of claim 1, further comprising:
   ascertaining the camera image using a surroundings detector.

5. The method of claim 1, further comprising:
   storing the camera image if, in the classifying, a classification inaccuracy with respect to the classification of the object is below a threshold value.

6. The method of claim 5, wherein in the storing, the camera image is sent to a training unit situated externally to the vehicle.

7. The method as recited in claim 1, wherein the camera is a camera of a surroundings detector of the vehicle.

8. The method as recited in claim 1, wherein the plausibility checking includes creating a 3D-wireframe model of the object.

9. A device for classifying an object for a vehicle, comprising:
   a processor device including hardware and situated in the vehicle, the processor device configured to perform the following:
   reading in, using a camera situated on the vehicle, a camera image of an object external to the vehicle;
   detecting the object including classifying the object from the camera image using a generic classifier, the generic classifier being a trained classifier including a learned object model which was learned in off-line training;

checking plausibility of a result of the detecting by comparing parameterized models and/or templates with image data;

extracting at least one specific object feature assigned to the object from the camera image;

creating a specific classifier using the specific object feature; and online-training the specific classifier wherein the at least one specific object feature is a color of the object.

10. The device as recited in claim 9, wherein the learned object model is a learned vehicle model, and the object external to the vehicle is another vehicle.

11. The device as recited in claim 9, wherein in the classifying, an additional object from an additional camera image, read in using the camera, is classified by the device using the generic classifier and the specific classifier, in the extracting, at least one specific object feature assigned to the object is extracted, by the device, from the additional camera image read in using the camera and, in the creating, the specific classifier is adapted, by the device, using the additional specific object feature.

12. The device as recited in claim 9, wherein the plausibility checking includes creating a 3D-wireframe model of the object.

13. A non-transitory computer readable medium having a computer program, which is executable by a processor, comprising:

a program code arrangement having program code for classifying an object for a vehicle, by performing, when executed by the processor, the following:

reading in, using a camera situated on a vehicle, a camera image of an object external to the vehicle;

detecting the object including classifying, using a device including hardware situated in the vehicle, the object from the camera image using a generic classifier, the generic classifier being a trained classifier including a learned object model which was learned in off-line training;

checking plausibility of a result of the detecting by comparing parameterized models and/or templates with image data;

extracting, using the device, at least one specific object feature assigned to the object from the camera image; and creating, using the device, a specific classifier using the specific object feature; and online-training the specific classifier.

14. The non-transitory computer readable medium of claim 13, wherein in the classifying, an additional object from an additional camera image, read in using the camera, is classified using the device using the generic classifier and the specific classifier, in the extracting, at least one specific object feature assigned to the object is extracted, using the device, from the additional camera image read in using the camera and, in the creating, the specific classifier is adapted, by the device, using the additional specific object feature.

15. The method as recited in claim 1, wherein the learned object model is a learned vehicle model, and the object external to the vehicle is another vehicle.

16. The non-transitory computer readable medium as recited in claim 13, wherein the learned object model is a learned vehicle model, and the object external to the vehicle is another vehicle.

17. The non-transitory computer readable medium as recited in claim 13, wherein the plausibility checking includes creating a 3D-wireframe model of the object.

* * * * *